Dec. 18, 1951  R. E. RAMONT  2,578,944
FRUIT CLEANING MACHINE
Filed April 27, 1946  2 SHEETS—SHEET 1

Inventor
Raymond E. Ramont
By Lyon & Lyon
Attorneys

Dec. 18, 1951     R. E. RAMONT     2,578,944
FRUIT CLEANING MACHINE
Filed April 27, 1946     2 SHEETS—SHEET 2
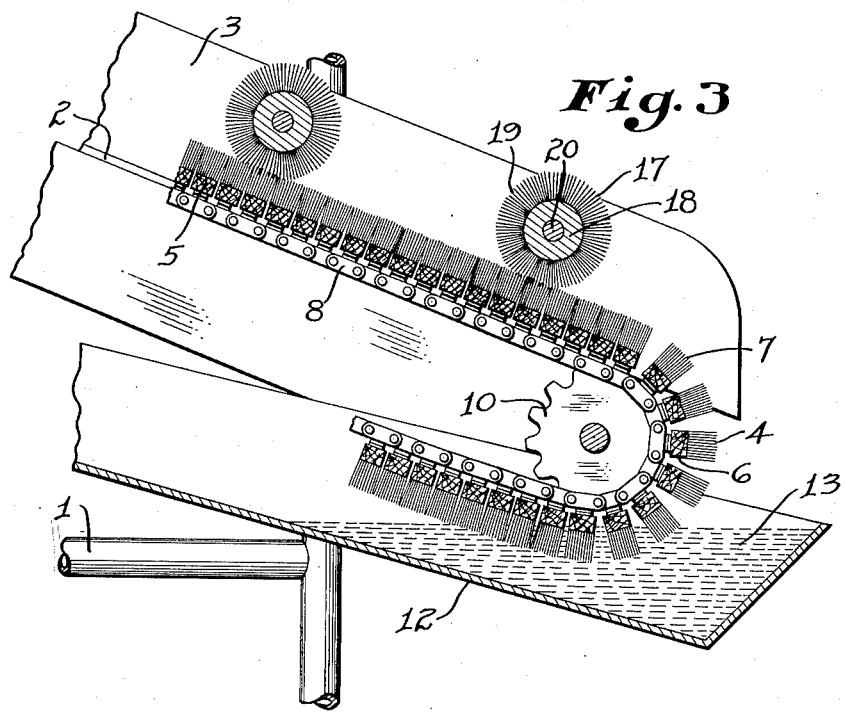
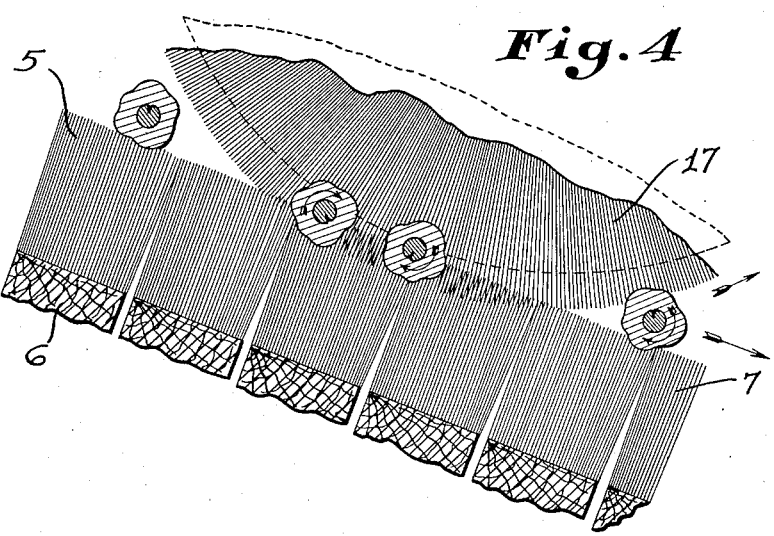
Inventor
Raymond E. Ramont
By Lyon & Lyon
Attorneys Patented Dec. 18, 1951

2,578,944

UNITED STATES PATENT OFFICE 2,578,944

FRUIT CLEANING MACHINE

Raymond E. Ramont, Los Angeles, Calif.

Application April 27, 1946, Serial No. 665,432

4 Claims. (Cl. 15—3.15)

My invention relates to fruit cleaning machines, more particularly to machines for cleaning dates and similar irregularly surfaced and easily damaged fruits. Among the objects of my invention are:

First, to provide a fruit cleaning machine wherein dates or similar fruits are thoroughly cleaned without breaking the skin even though the fruit be overripe.

Second, to provide a fruit cleaning machine wherein the fruit is supported on a novel bristle carpet or belt passed over novelly arranged bristle rollers which so coact with the carpet or belt that all parts of the fruit, even recessed portions, are reached and cleaned without subjecting the fruit to appreciable pressure.

Third, to provide a machine which is particularly suited for cleaning dates or other fruits having high sugar content in that the machine is self-cleaning and does not become sticky or otherwise contaminated with fruit particles.

Fourth, to provide a machine of this character which applies to the fruit a cleaning and polishing solution in the form of a thin film which is virtually undetectable except for the improved appearance and handling properties of the treated fruit.

Fifth, to provide a fruit cleaning material or solution and a method of cleaning fruit which is particularly effective in improving the appearance and handling properties of dates or the like without in any manner harming the fruit or rendering it less palatable or healthful.

Sixth, to provide a machine for cleaning fruit wherein the wetting of the fruit is reduced to a minimum, thereby providing a machine which minimizes the danger of mold growth, a danger which is particularly inherent in dates.

With the above and other objects in view, which may appear hereinafter, reference is directed to the accompanying drawings in which:

Fig. 3 is an enlarged fragmentary longitudinal sectional view of my machine, the view being taken parallel to Fig. 2.

Fig. 4 is a fully enlarged, essentially diagrammatic view illustrating the manner in which the fruit, for example, dates, is cleaned.

Figure 1:
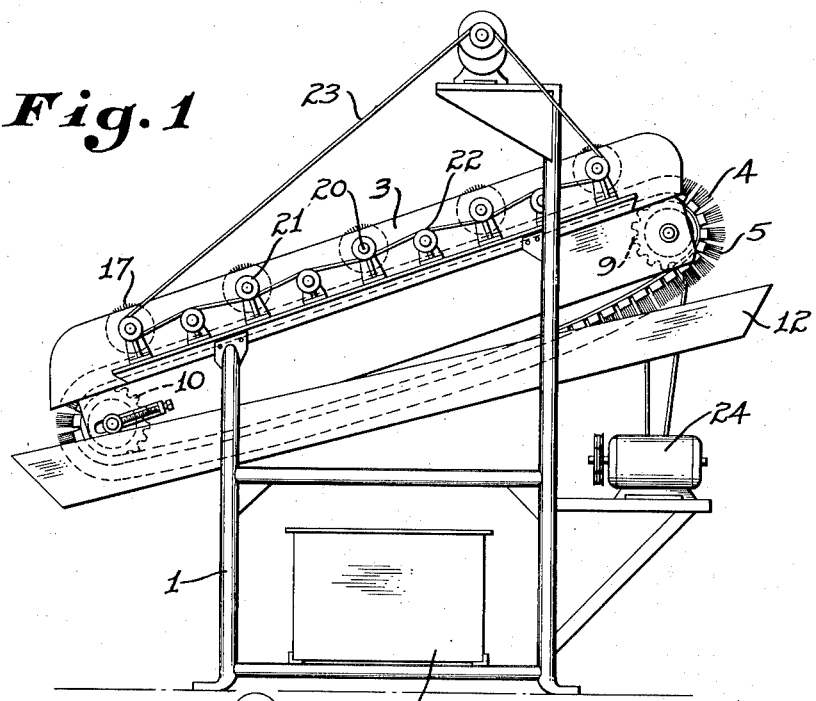
Fig. 1 is a side view of my fruit cleaning machine.
Figure 2:
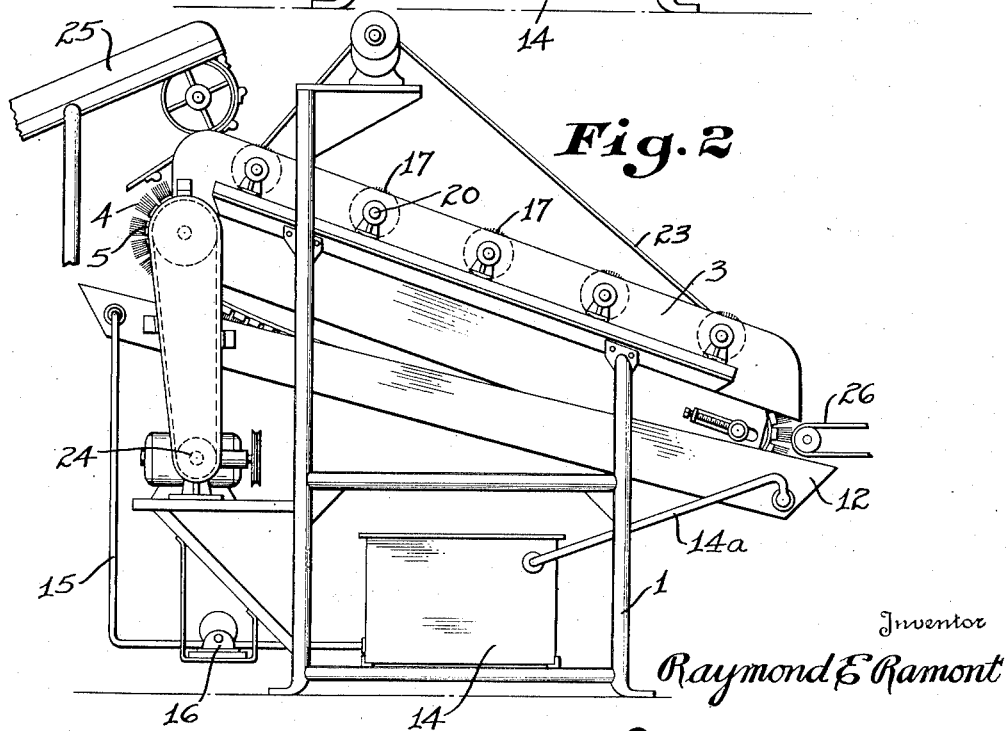
Fig. 2 is an opposite side view thereof.

My machine is mounted on a suitable frame structure 1 and includes an inclined marginal table or guide 2 having side plates 3. A brush belt 4 is positioned so that its upper reach moves downwardly on the table 2. The brush belt comprises a plurality of brush units 5, each having a transversely extending mounting block 6 from which project bristles 7. The bristles are preferably horse hair bristles and relatively long, two inch bristles having been found satisfactory.

The blocks 6 are mounted on a pair of chains 8 which pass around drive sprockets 9 at the upper end of the table 2 and idler sprockets 10 at the lower end thereof. The blocks are closely positioned so that the bristles of adjacent blocks are crowded together and present a continuous uniform upper carpet or belt of up-ended bristles so that the fruit rides on the surface defined by the extremities of the bristles.

The drive sprockets 9 are rotated by suitable drive means comprising a motor, gear reduction unit and appropriate belts or chains.

The lower reach of the brush belt 4 travels in a trough 12 which extends under the table 2. The trough is inclined so that its lower end forms a container 13 for the special cleansing and polishing solution to be described hereinafter. The frame 1 supports a reservoir 14 for the cleansing solution, connected by a pipe line 15 in which is interposed a pump 16 with the upper end of the trough 12. A return line 14a communicates between the reservoir and the lower end of the trough. The lower extremity of the brush belt dips into the solution in the container portion 13. The brushes on emerging from this solution drain into the trough as they move upwardly. While under severe conditions it is desirable to maintain a circulating flow of cleansing solution, it has been found feasible in many instances to circulate the cleansing fluid periodically or merely refill the container portion 13 from time to time. It should be pointed out that the brush units are dampened by the solution rather than caused to contain a large quantity of liquid. At least the extremities appear to be merely film-coated with the cleansing solution as the upper reach of the brush possesses a damp as distinguished from a saturated surface. As will be brought out hereinafter, it is important that the amount of moisture contacting the fruit be maintained at a minimum.

Mounted above the upper reach of the brush belt 4 is a series of brush rollers 17, each having a core 18 from which radiate bristles 19, similar to the bristles 7. The brush rollers 17 are mounted on shafts 20 which protrude through the side plates 3 and are provided with pulleys or sprockets 21. Between the pulleys 21, the frame 1 supports idler pulleys 22 and a drive belt or chain 23 threaded around the drive idler pulleys or sprockets and operatively connected with a suitable drive means 24, such as a motor and gear reduction unit. The lower reaches of the rollers 17 preferably rotate in the direction of movement of the upper reach of the brush belt; that is, downwardly or to the right as shown in Figs. 3 and 4. The peripherial speed of the brush rollers 17 is preferably eight or ten times faster than the lineal speed of the brush belt 4. The brush rollers 17 may be mounted to mesh with the brush belt as shown by solid lines in Fig. 4, or spaced therefrom a slight distance as indicated by dotted lines, depending on the condition, type, and size of the fruit.

A suitable feeding conveyor 25 deposits fruit at the upper end of the brush belt 4 and a suitable collecting means 26 carries the fruit away from the lower end of the brush belt.

While my cleansing solution to be used depends on the type of fruit to be cleaned, I have found that the following solution is quite superior in the cleaning of dates. This solution is a 5% water solution of propylene glycol. While a 5% solution is recommended a stronger solution may be used, or alcohol may be substituted for part of the water. For example, the following solution has been found advantageous for soft, overripe, and sticky or watery dates:

50% alcohol
45% water
5% propylene glycol

The various solutions of water, alcohol, and propylene glycol or water and propylene glycol alone have in common the property of reducing or virtually eliminating the stickiness of the surfaces of the fruit, particularly dates, although an extremely thin coating is applied by my machine, the handling properties of the dates are greatly improved.

Operation of my cleansing machine as used in the cleaning of dates is as follows:

Before placing the dates in my machine, they are first placed in a shaker to remove excess debris, sand, beetles or other insects. They are then dumped onto the upper extremity of the brush belt, a few at a time so that contact or piling up of the dates on each other is substantially avoided.

Although the contacting surfaces of the brush rollers and brush belt are moving in the same direction; that is, downwardly, the dates appear to pause momentarily and rotate or spin before passing under the rotating brushes. It is believed that this momentary pause and rotation contributes to effective cleaning of the dates. Between the rollers the dates tumble and roll down the incline of the brush belt 4, usually at a faster speed than that of the brush belt. In passing between the rollers and the brush belt, the dates appear to be pressed into and between the bristle means as shown in Fig. 4 so that the bristles wipe and clean into the irregularities of the surface of the dates. This action is quite gentle, however, and even overripe dates may be passed through the machine with a minimum of damage. Furthermore, by adjusting the spacing between the brushes, the amount of pressure may be adjusted to meet conditions. Thus, for very soft fruit, as well as for extra large fruit, slight space between the brushes is desirable.

The rollers have sufficient contact with the surface of the brush belt that the extremities of their bristles become coated with the cleansing solution and are themselves cleaned by their wiping engagement with the bristles of the belt. The belt as it passes around the idler pulleys dips into the cleansing solution and is washed. During the upper travel of the bristles along the lower reach of the belt, they drain so that the surface of the belt contacted by the dates is moist rather than wet. This is fully evidenced by the fact that the date as it issues from the machine does not appear to be wet, and in any event is not wetted sufficiently to promote mold growth. If slight space is provided between the brushes, the upper rotary brushes are washed periodically with the propylene glycol solution, or the brushes may be sprayed. However, it has been found that most of the substance cleaned from the fruit is picked up by the brush belt rather than the brush rollers so that cleaning of the brush rollers is not an acute problem.

Although the cleansing solution contains a comparatively small percentage of propylene glycol, the cleansing action is much different than would be the case if water alone were used. Water alone tends to draw the sugar of the date to the surface and increase rather than decrease its stickiness. This stickiness is transferred to the belts, conveyors, chutes and other equipment over which the date passes in the process of cleaning, grading, and packing, and soon renders the equipment so sticky that the date is torn and mashed. I have found that in addition to the use of the solution specified above in connection with my cleansing machine, that a stronger solution, for example, a 50% solution of propylene glycol and water, may be applied as a lubricant to all belts, elevators, chutes, etc., which may be contacted by the dates, virtually eliminates the accumulation of sticky areas.

Having fully described my invention, it is to be understood that I do not wish to be limited to the details herein set forth, but my invention is of the full scope of the appended claims.

I claim:

1. A fruit cleaning machine, involving: an inclined endless belt of bristle brush units, the upper reach of said belt forming a downwardly moving carpet of upstanding bristles on which the fruit to be cleaned rolls and tumbles from the upper receiving end of said carpet to the lower discharge end thereof; and a series of spaced cylindrical bristle brushes traversing said carpet, their undersides meshing therewith and moving in the same direction as said carpet.

2. A fruit cleaning machine, involving: means forming an inclined, downwardly moving carpet of upstanding bristles, over which fruit may tumble and roll by gravity assisted by the downward movement of said carpet; means for film coating said bristles with a cleansing solution; and a series of spaced cylindrical bristle brushes traversing said carpet, their undersides meshing therewith and moving in the same direction as said carpet.

3. A fruit cleaning machine, comprising: an inclined endless belt of bristle brush units; an inclined pan under said belt, the lower end of said pan forming a container for a cleansing solution; the lower end of said belt dipping into said container, and its under reach adapted to travel upwardly over said pan whereby excess solution drains into said pan from said bristle brushes; means for guiding the upper reach of said belt to dispose the bristle brush units thereof in juxtaposition with their bristles directed upwardly to form a downwardly moving carpet over which fruit may roll and tumble; and a series of bristle rollers transversely disposed above said carpet, their bristles meshing therewith and moving in the same direction; the bristles of said belt and said rollers being relatively long and flexible whereby fruit passing between said rollers and said carpet is completely enveloped thereby.

4. A fruit cleaning machine comprising: an inclined endless belt of bristle brush units; means for guiding the upper reach of said belt to dispose the bristle brush units thereof in juxtaposition with their bristles directed upwardly to form a downwardly moving carpet over which the fruit may roll; means for coating said bristles with a liquid; a series of bristle rollers transversely disposed above said carpet, their bristles meshing therewith and moving in the same direction; the bristles of said belt and said rollers being relatively long and flexible whereby the fruit passing between said rollers and said carpet is completely enveloped thereby.

RAYMOND E. RAMONT.

REFERENCES CITED

The following references are of record in the file of this patent:

UNITED STATES PATENTS

| Number | Name | Date |
| --- | --- | --- |
| 459,337 | Strong et al. | Sept. 8, 1891 |
| 997,081 | Nye | July 4, 1911 |
| 1,095,942 | Stevens | May 5, 1914 |
| 1,786,405 | Brogden | Dec. 23, 1930 |
| 1,873,832 | Farley | Aug. 23, 1932 |
| 1,952,429 | Ghent | Mar. 27, 1934 |
| 2,100,942 | Cutler | Nov. 30, 1937 |
| 2,223,168 | Dombrow | Nov. 26, 1940 |